US012692736B1

(12) United States Patent
Jenkins, Jr.

(10) Patent No.: US 12,692,736 B1
(45) Date of Patent: Jul. 28, 2026

(54) SELF-ALIGNING TENSION DOOR HINGE

(71) Applicant: William O Jenkins, Jr., Brandon, MS (US)

(72) Inventor: William O Jenkins, Jr., Brandon, MS (US)

( * ) Notice: Subject to any disclaimer, the term of this patent is extended or adjusted under 35 U.S.C. 154(b) by 40 days.

(21) Appl. No.: 18/831,020

(22) Filed: May 1, 2024

(51) Int. Cl.

| | |
|---|---|
| ***E05D 11/08*** | (2006.01) |
| ***E05D 3/06*** | (2006.01) |
| ***E05D 5/04*** | (2006.01) |
| ***E05D 11/00*** | (2006.01) |

(52) U.S. Cl.
CPC ................ *E05D 11/00* (2013.01); *E05D 3/06* (2013.01); *E05D 5/04* (2013.01); *E05Y 2900/132* (2013.01)

(58) Field of Classification Search
CPC ....... E05D 11/00; E05D 11/08; E05D 11/081; E05D 11/082; E05D 3/06; E05D 5/04; E05Y 2900/132
See application file for complete search history.

(56) References Cited

U.S. PATENT DOCUMENTS 3,015,126 A * 1/1962 Ahlgren .................. E05D 5/127 16/385
4,237,577 A * 12/1980 Chapel ................ E05D 11/0027 16/388
4,543,687 A * 10/1985 Law .......................... E05D 5/04 16/388
4,639,147 A * 1/1987 Schwarz ................ A47K 13/12 4/240
6,163,929 A * 12/2000 Bradley .................. E05D 5/127 16/386
7,891,055 B1 * 2/2011 Combs .................. E05D 11/084 16/386
2002/0112319 A1 * 8/2002 Kida ..................... G06F 1/1616 16/342
2005/0273978 A1 * 12/2005 Norman, Jr. .......... E05D 11/082 16/342
2006/0156512 A1 * 7/2006 Naylor .................... E05D 5/128 16/273
2006/0225248 A1 * 10/2006 Ishiwata ............... E05D 11/082 16/330
2009/0165248 A1 * 7/2009 Wang .................... E05D 11/082 16/339
2010/0146734 A1 * 6/2010 Munson .................. E05D 5/121 16/337

(Continued)

*Primary Examiner* — Chuck Y Mah
(74) *Attorney, Agent, or Firm* — Jones Walker LLP

(57) ABSTRACT

A Self-Aligning Tension Door Hinge is disclosed comprised of two specifically designed hinge pins that bind the top and bottom hinge plates while protruding into the sleeved arms of said hinge plates and thereby securing the adjacent hinge plates (in a non-binding manner) that allows for free rotation of the movable hinge plates. Paramount to the present invention is a sleeve insert made of any material that will accomplish a compression binding of the two or more movable hinge plates to accomplish the goal of keeping the door from swinging open or shut due to gravity forces. Also, the present invention is designed and engineered to fold flat when closed, thus eliminating the costly need to mortise the door slab or the door jamb. Additionally, the present invention features two or more angled projections on each hinge plate to allow for a perfect alignment of this hinge to the door slab and to the door jamb during the installation of the door.

5 Claims, 4 Drawing Sheets

(56) References Cited

U.S. PATENT DOCUMENTS

Figure 1:
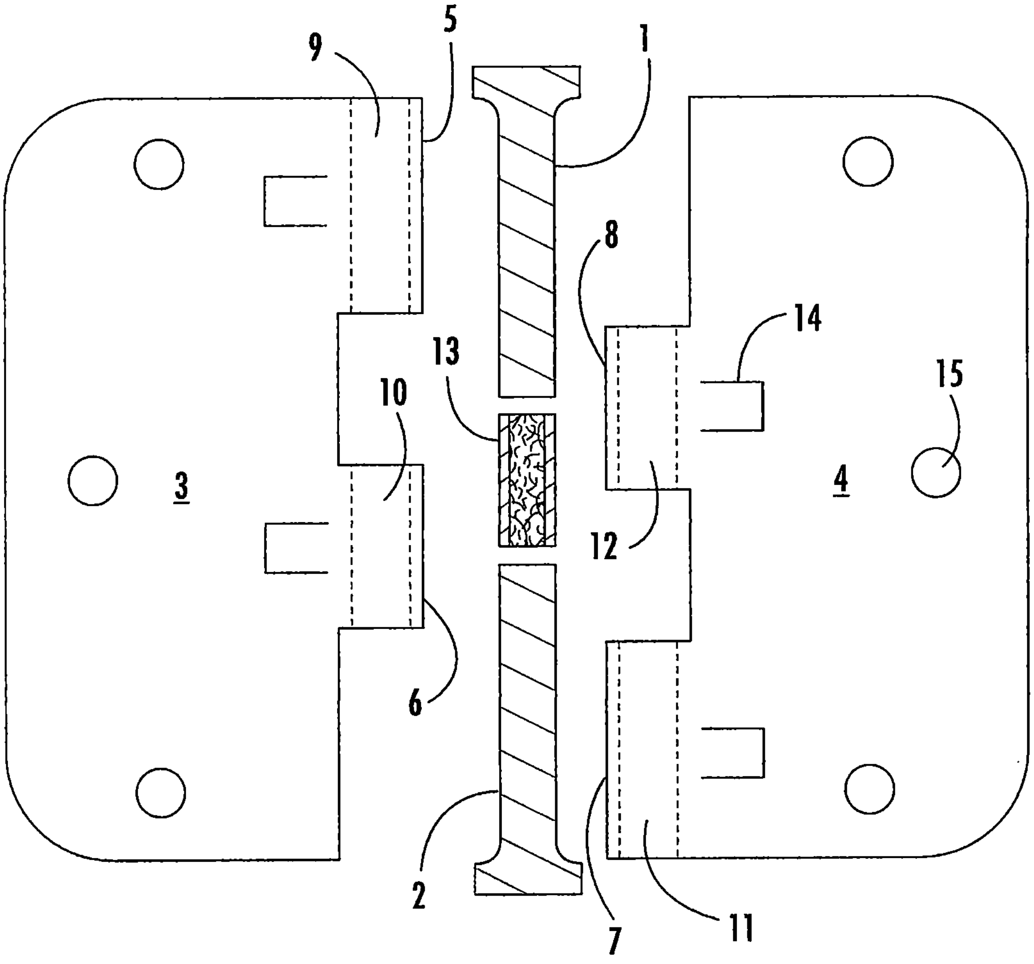
Figure 2:
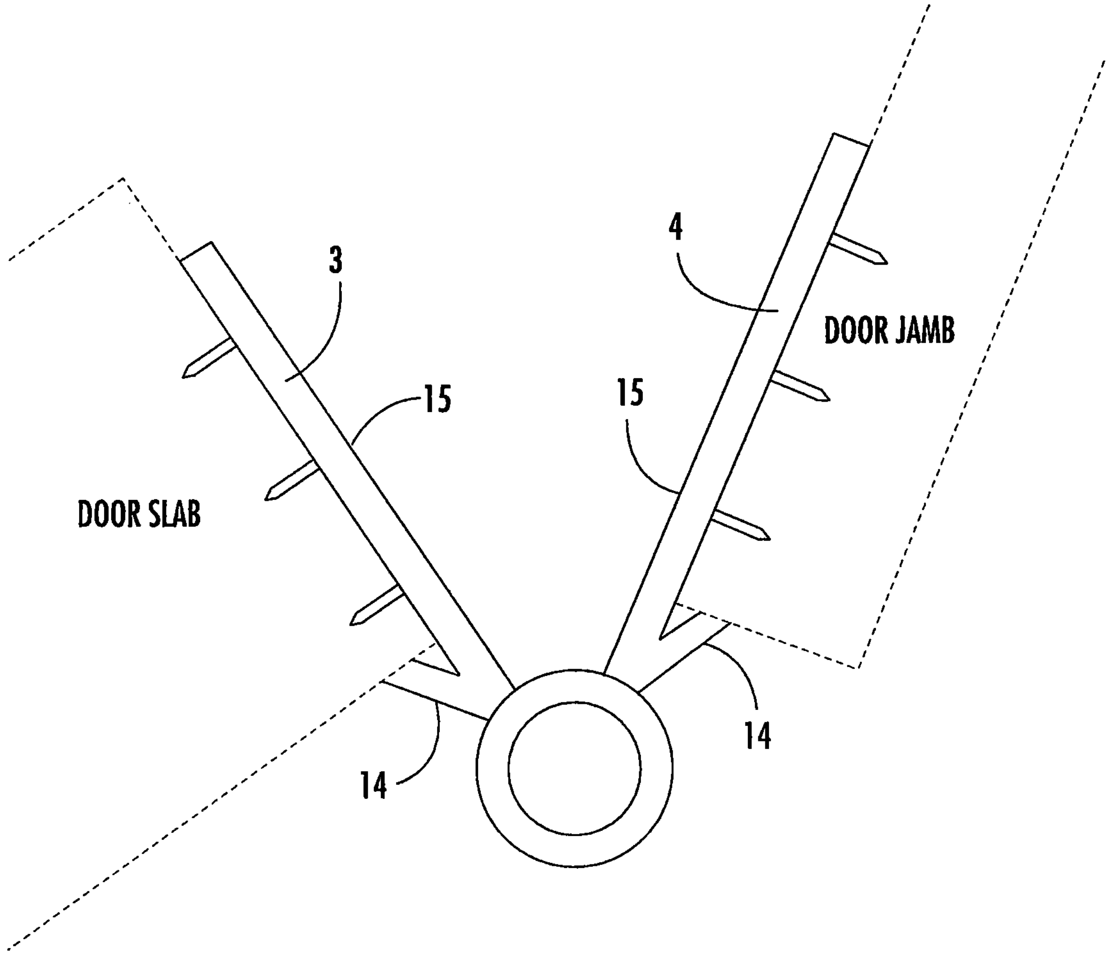
Figure 3:
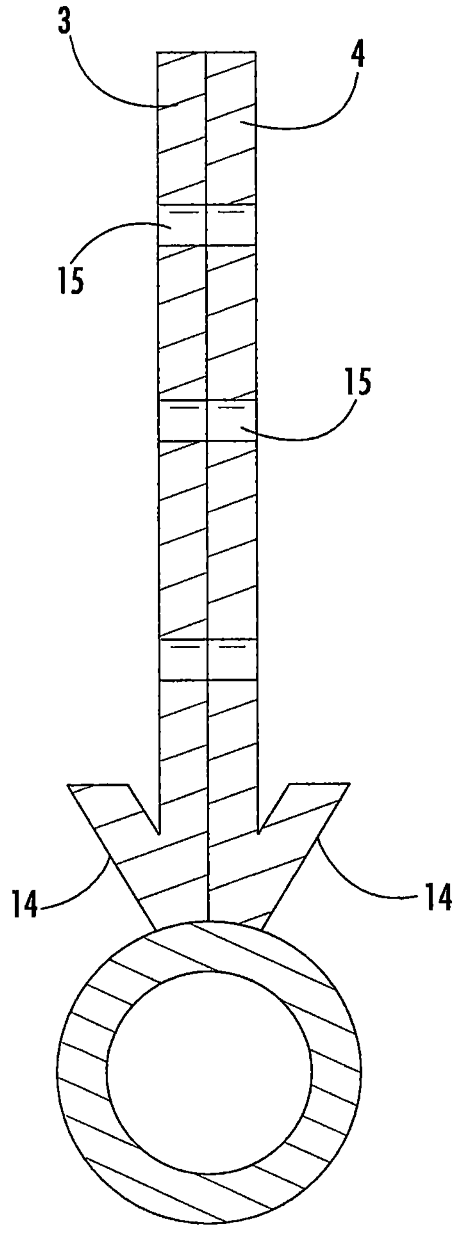
Figure 4:
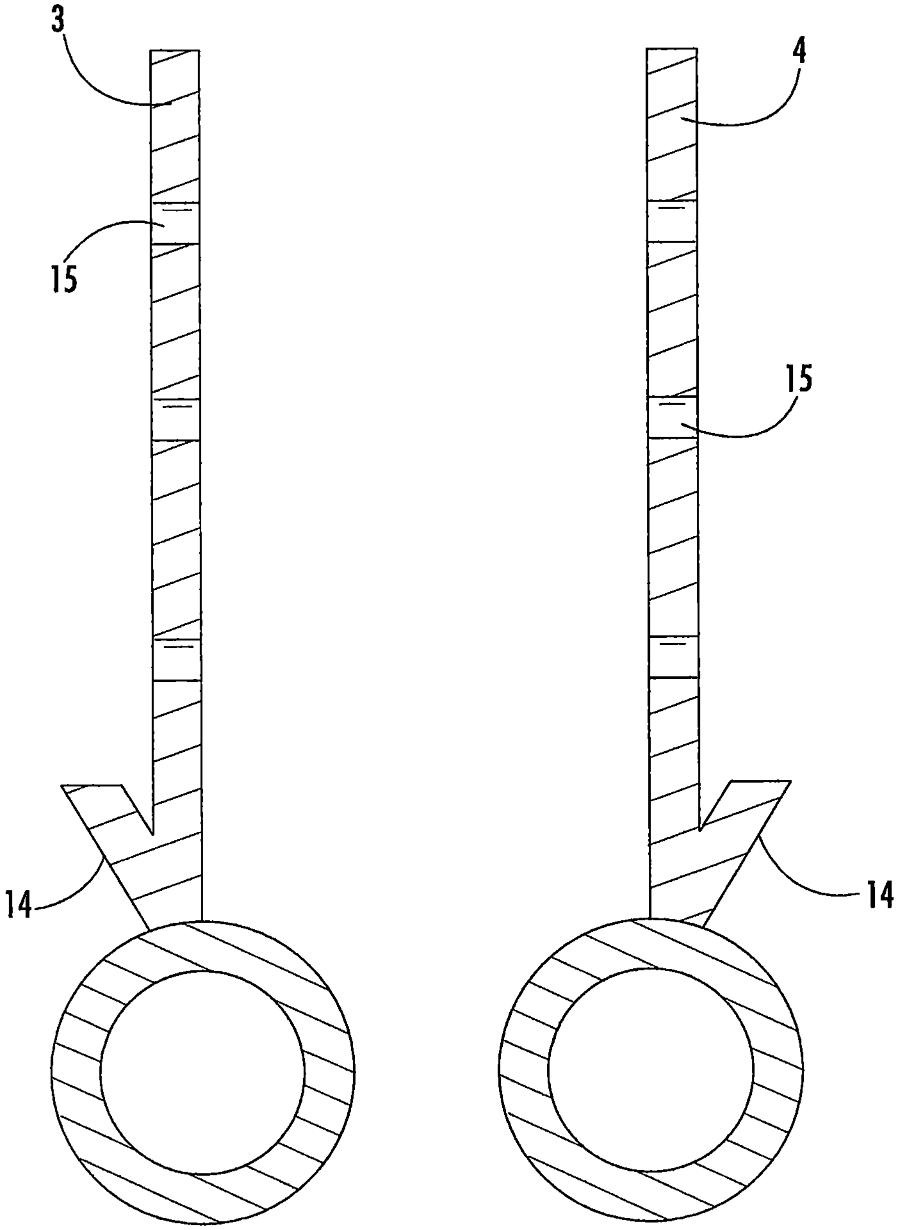

| | | | | |
|---|---|---|---|---|
| 2014/0090204 | A1* | 4/2014 | Sarnowski | E05D 3/02 16/340 |
| 2019/0211599 | A1* | 7/2019 | Ju | E05D 11/082 |
| 2024/0035325 | A1* | 2/2024 | Krailo | E05D 11/082 |

* cited by examiner

SELF-ALIGNING TENSION DOOR HINGE

BACKGROUND OF THE INVENTION

The present invention deals with a door hinge with a top hinge pin and a bottom hinge pin. The two pins are designed to lock the top and the bottom hinge plates together by means of friction and stress forces on the outer sleeved arms of the hinge plates, while allowing the two or more inner hinge arms to rotate freely. Also, there is a separate insert apparatus that applies constant pressure to the two or more inner hinge arms to accomplish its purpose of keeping the door from swinging open or shut due to gravity forces. During the hinge manufacturing process, when the hinge parts are stamped out or extruded, there will be two or more projections (projected pieces) punched partially through each hinge plate to form a guide stop for a perfect alignment of the hinge on the door slab and to the door jamb. The hinge manufacturing process will also accomplish the goal of molding both hinge parts so they will close flat against each other, thus eliminating the need to mortise the door slab or to mortise the door jamb.

BRIEF SUMMARY OF THE INVENTION

The advantages of the SELF-ALIGNING TENSION DOOR HINGE are numerous. The present invention will save time and money during the installation process of attaching a door slab to the door jamb. The present invention eliminates the costly process of mortising the door slab or mortising the door jamb. The present invention will self-align to the door slab and self-align to the door jamb for a quick and perfectly aligned application. Also, the insert of the present invention in combination with the hinge pins will keep constant pressure on the two moving parts, thus not allowing the door to swing open or shut due to gravity forces.

BRIEF DESCRIPTION OF THE SEVERAL VIEWS OF THE DRAWING(S)

FIG. 1

I. shows the top hinge pin 1 designed to bindingly insert into sleeve 9 of outer sleeved arm 5 of top hinge plate 3 while the lower shaft of top hinge pin 1 is tapered to protrude a non-binding distance into sleeve 12 of inner sleeved arm 8 of bottom hinge plate 4 to secure the top hinge plate 3 to bottom hinge plate 4 together while allowing for free movement of the two plates as the door opens and closes.

II. shows the bottom hinge pin 2 designed to bindingly insert into sleeve 11 of outer sleeved arm 7 of bottom hinge plate 4 while the upper shaft of bottom hinge pin 2 is tapered to protrude a non-binding distance into sleeve 10 of inner sleeved arm 6 of top hinge plate 3 to secure the bottom hinge plate 4 to top hinge plate 3 together while allowing for free movement of the two plates as the door opens and closes.

III. shows insert 13 that applies a constant pressure to inner sleeved arm 6 of top hinge plate 3 and to inner sleeved arm 8 of bottom hinge plate 4 when compressed by top hinge pin 1 being inserted into sleeve 12 of inner sleeved arm 8 of bottom hinge plate 4 and bottom hinge pin 2 being inserted into sleeve 10 of inner sleeved arm 6 of top hinge plate 3. This constant pressure prevents the door from swinging open or shut due to gravity.

IV. shows outer sleeved arm 5 and inner sleeved arm 6 of top hinge plate 3 as well as outer sleeved arm 7 and inner sleeved arm 8 of bottom hinge plate 4 all manufactured or molded into a tubular structure which allow insertion of top hinge pin 1 and bottom hinge pin 2 to be inserted and put tension on hinge plate 3 and hinge plate 4, respectively.

V. shows top hinge plate 3 and bottom hinge plate 4, which can be stamped, molded or extruded to have angled projections 14 on each hinge plate. The two hinge plates can be identical, thus requiring only one mold for manufacturing and thereby reducing costs and increasing efficiency.

VI. shows angled projections 14 protruding through the hinge plates, and thereby allowing for a perfect alignment of the hinge to the door slab and to the door jamb during installation.

VII. shows holes 15 molded or manufactured in top hinge plate 3 and bottom hinge plate 4, respectively, which holes 15 allow fastener insertion to attach one hinge plates to a door jamb and the other hinge plate to a door slab.

FIG. 2

Shows the hinge assembly of the present invention with top hinge plate 3 attached to a door slab with fasteners through holes 15 and bottom hinge plate 4 attached to a door jamb with fasteners through holes 15. It also shows angled projections 14 providing perfect alignment of the hinge with the door slab and door jamb, respectively.

FIG. 3

Shows the hinge assembly of the present invention with top hinge plate 3 mating with bottom hinge plate 4 in a closed flat position. This flat design allows for the hinges to be attached to the door slab and the door jamb without the need to mortise the door slab or the door jamb.

FIG. 4

Shows that the identical structure of top hinge plate 3 and bottom hinge plate 4, which identical structure allow them to be stamped or extruded from only one mold for cost efficiency.

What is claimed is:

1. A hinge adapted to be mounted between a door and a doorframe, the hinge comprising:

- a top hinge plate with two angled projections and having an outer arm and an inner arm formed on an edge thereof,
- a bottom hinge plate with two angled projections and having an outer arm and an inner arm formed on an edge thereof,
- each of said outer arms and inner arms being of tubular shape, and the outer arm and the inner arm of said top hinge plate interdigitally mating the outer arm and the inner arm of said bottom plate such that the inner arms and the outer arms are coaxially aligned,
- a compressible insert sized to fit at least partially inside of both the inner arms of the top hinge plate and the bottom hinge plate,
- a top hinge pin shaped to fit into the outer arm of the top hinge plate and tapered to fit into the inner arm of the bottom hinge plate to apply compression force upon said insert,
- a bottom hinge pin shaped to fit into the outer arm of the bottom hinge plate and tapered to fit into the inner arm of the top hinge plate to apply compression force upon said insert, and
- wherein said insert maintains a constant pressure on the inner arms to prevent the door from swinging due to gravity.

2. The hinge of claim 1, wherein the top hinge plate comprises one or more projections.

3. The hinge of claim 1, wherein the bottom hinge plate comprises one or more projections.

4. The hinge of claim 2, wherein the one or more projections are configured to align the hinge with a door slab.

5. The hinge of claim 3, wherein the one or more projections are configured to align the hinge with a door jamb.

* * * * *